US012638986B2

(12) United States Patent
   Sharma et al.

(10) Patent No.: US 12,638,986 B2
(45) Date of Patent: May 26, 2026

(54) OPTIMIZING DIE UTILIZATION IN MULTI-META DIE BASED STORAGE DEVICES

(71) Applicant: SanDisk Technologies LLC, Addison, TX (US)

(72) Inventors: Amit Sharma, Bengaluru (IN); Dinesh Kumar Agarwal, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/409,585

(22) Filed: Jan. 10, 2024

(65) Prior Publication Data

US 2025/0224892 A1     Jul. 10, 2025

(51) Int. Cl.
   *G06F 3/06*          (2006.01)
(52) U.S. Cl.
   CPC .......... *G06F 3/0631* (2013.01); *G06F 3/0604* (2013.01); *G06F 3/0679* (2013.01)
(58) Field of Classification Search
   CPC ..... G06F 3/0631; G06F 3/0604; G06F 3/0679
   USPC .................................................. 711/154, 100
   See application file for complete search history.

(56) References Cited

U.S. PATENT DOCUMENTS 9,734,050 B2      8/2017   Sinclair
10,572,169 B2     2/2020   Frid 10,901,891 B2     1/2021   Byun
11,593,262 B1     2/2023   Henze
2014/0185376 A1*  7/2014   Sinclair ................. G06F 3/0658
                                                  365/185.03
2016/0357474 A1*  12/2016  Frid ....................... G06F 3/0683
2022/0291836 A1*  9/2022   Tran ..................... G06F 3/0626

OTHER PUBLICATIONS

Gao, Congming, Liang Shi, Yejia Di, Qiao Li, Chun Jason Xue, Kaijie Wu, and Edwin Sha; Exploiting Chip Idleness for Minimizing Garbage Collection-Induced Chip Access Conflict on SSDs; 2017, ACM Transactions on Design Automation of Electronic Systems (TODAES), Oct. 5, 2023(2), pp. 1-29.

\* cited by examiner

*Primary Examiner* — Hosain T Alam
*Assistant Examiner* — Zubair Ahmed
(74) *Attorney, Agent, or Firm* — Arlene Neal; NEAL BLIBO LLC

(57)          ABSTRACT

A storage device optimizes die utilization in multi-meta die-based environments. The storage device includes a memory device including multiple meta dies. When a controller on the storage device receives host instructions, the controller selects a first meta die on which to execute the host instruction. If the controller identifies that at least one inactive die is present on the first meta die and that the first meta die has unused bandwidth, the controller selects a second meta die having a pending background operation. The controller transfers the unused bandwidth from the first meta die to the second meta die. The controller executes the background operation on the second meta die, using the unused bandwidth from the first meta die, in parallel with foreground operation on the first meta die.

18 Claims, 7 Drawing Sheets

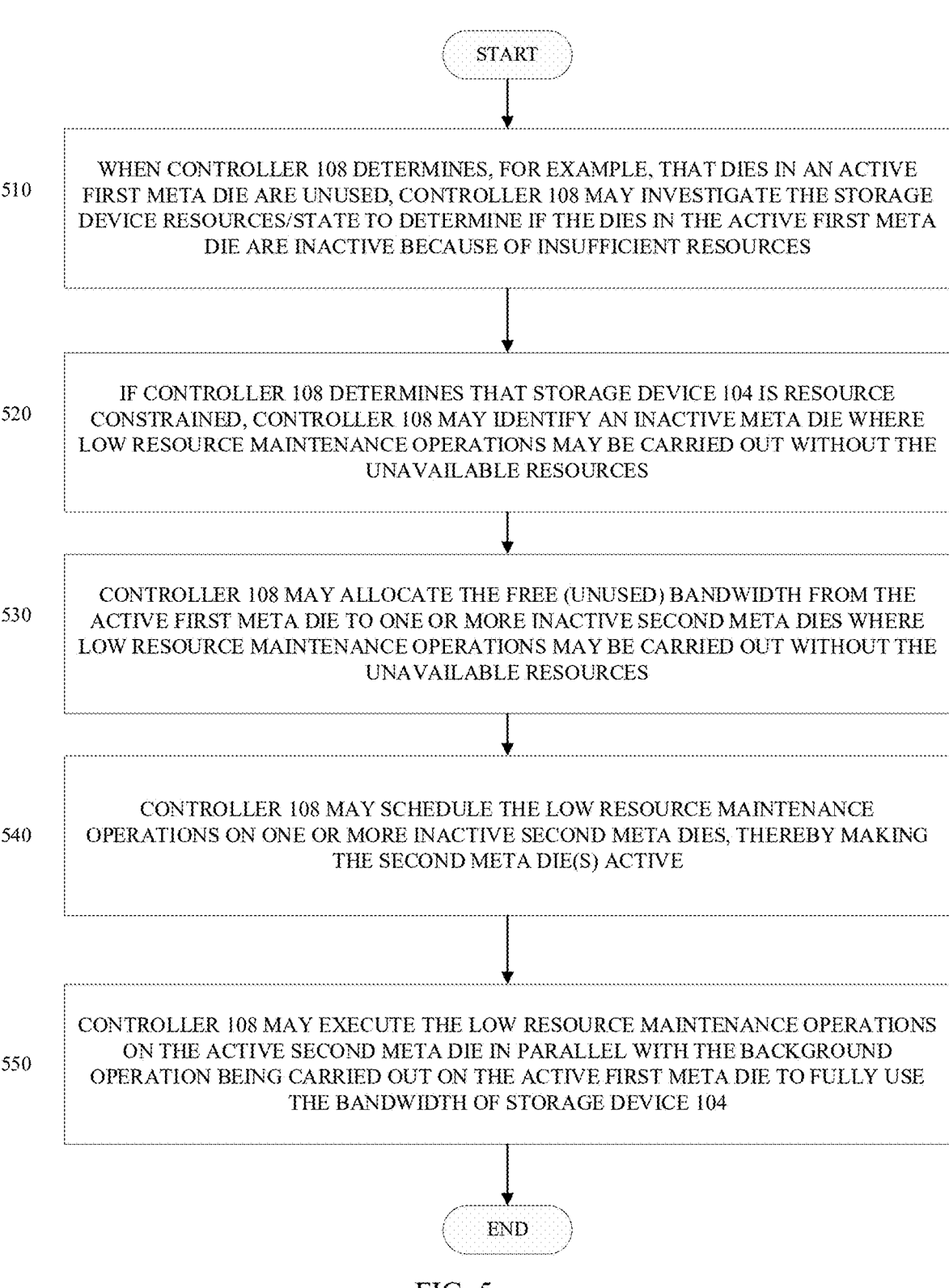

START

510 WHEN CONTROLLER 108 DETERMINES, FOR EXAMPLE, THAT DIES IN AN ACTIVE FIRST META DIE ARE UNUSED, CONTROLLER 108 MAY INVESTIGATE THE STORAGE DEVICE RESOURCES/STATE TO DETERMINE IF THE DIES IN THE ACTIVE FIRST META DIE ARE INACTIVE BECAUSE OF INSUFFICIENT RESOURCES

520 IF CONTROLLER 108 DETERMINES THAT STORAGE DEVICE 104 IS RESOURCE CONSTRAINED, CONTROLLER 108 MAY IDENTIFY AN INACTIVE META DIE WHERE LOW RESOURCE MAINTENANCE OPERATIONS MAY BE CARRIED OUT WITHOUT THE UNAVAILABLE RESOURCES

530 CONTROLLER 108 MAY ALLOCATE THE FREE (UNUSED) BANDWIDTH FROM THE ACTIVE FIRST META DIE TO ONE OR MORE INACTIVE SECOND META DIES WHERE LOW RESOURCE MAINTENANCE OPERATIONS MAY BE CARRIED OUT WITHOUT THE UNAVAILABLE RESOURCES

540 CONTROLLER 108 MAY SCHEDULE THE LOW RESOURCE MAINTENANCE OPERATIONS ON ONE OR MORE INACTIVE SECOND META DIES, THEREBY MAKING THE SECOND META DIE(S) ACTIVE

550 CONTROLLER 108 MAY EXECUTE THE LOW RESOURCE MAINTENANCE OPERATIONS ON THE ACTIVE SECOND META DIE IN PARALLEL WITH THE BACKGROUND OPERATION BEING CARRIED OUT ON THE ACTIVE FIRST META DIE TO FULLY USE THE BANDWIDTH OF STORAGE DEVICE 104

END

OPTIMIZING DIE UTILIZATION IN MULTI-META DIE BASED STORAGE DEVICES

BACKGROUND

A storage device may be communicatively coupled to a host and to non-volatile memory including, for example, a NAND flash memory device on which the storage device may store data received from the host. The memory device may include one or more dies, each of which may be independently programmed, read, and/or erased. Each of the dies may be divided into blocks, the smallest erasable unit, and each block may include multiple pages. A controller on the storage device may read data from and/or write data to pages in a block. During design of a storage device architecture, the number of dies to be included in the storage device may be calculated based on the capacity requirements of the storage device and as the capacity of the storage device increases, the number of dies included in the storage device may also increase. For example, an eight terabyte (TB) storage device may include more dies than a four TB storage device.

The storage device may include one or more meta dies (i.e., a logical group of dies) formed to operate multiple dies in parallel to improve the performance of the storage device. When using a meta die, the controller may operate on a meta block and meta page level. A meta block is a logical block including one block from each die in the meta die and the meta page is a logical page including one page from each block in the meta block. The controller may engage each page in the meta page in parallel to improve the performance of the storage device.

The storage device may obtain power from the host and there may be a power ceiling as to the maximum amount of power the storage device may draw from the host. Depending on the power ceiling of the storage device, the storage device may be unable to operate all dies on the storage device in parallel and may thus engage a subset of the dies that are included in a meta die. Consider an example where the storage device includes sixteen dies but due to the power ceiling, the storage device may engage a maximum of four dies simultaneously at a sustained write speed. To satisfy the power constraints on the storage device, four meta dies may be formed on the storage device. For example, meta die 0 may include dies 0-3 on the storage device, meta die 1 may include dies 4-7, meta die 2 may include dies 8-11 and meta die 3 may include dies 12-15. Each of the meta dies may consume the maximum power at a sustained write speed and the controller may operate one meta die at a time. To ensure uniform use of the meta dies, the controller may use the meta dies at the same or similar rate. For example, the controller may perform write operations and sequential read operation by traversing data sequentially across a meta die at a meta page level. For example, the controller may write to a meta die by writing to page 1 on die 0, page 1 on die 1, and so on.

In some instances, all of the dies in a meta die may not be operable in parallel. For example, the storage device may not have sufficient resources (for example, random-access memory (RAM) or direct memory access (DMA) speed) to operate all dies in a meta die in parallel. Using the example meta die configuration previously described, the controller may write to die 0 and die 1 in meta die 0 but may not write to die 2 and die 3 because of insufficient resources. In another example, the host data may be written in a format that stores one bit per memory cell as opposed to a format that stores multiple bits per memory cell. As such, the storage device may not need to engage all the dies in a meta die when using a burst speed instead of a sustained speed. When the storage device fails to operate the maximum allowable number of dies, the storage device may not operate at its full performance potential.

A current implementation identifies idle dies and executes internal operations on the idle dies. For example, the storage device may include a host meta die and a relocation meta die, each of which may include four dies. If, for example, at a time 0 host data is written to dies 0-2 on the host meta die and die 3 on the host meta die is identified as being idle, an internal operation may be executed on die 3 on the relocation meta die. If the internal operation takes, for example, 500 microseconds ($\mu$s), the internal operation may block the host data sent at time 2 (for example, time 0+100 $\mu$s) from being written to die 3 on the host meta block until the internal operation is completed. Blocking host data from being written may degrade the quality of service provided by the storage device to the host. Furthermore, the controller may perform internal write operation in a logical order and a free die in the relocation meta die might not be the next die that is scheduled to be programmed for internal operations. A system is therefore needed to optimize die utilization in multi-meta die-based storage devices.

SUMMARY

In some implementations, the storage device optimizes die utilization in multi-meta die-based environments. The storage device includes a memory device including multiple meta dies. When a controller on the storage device receives host instructions, the controller selects a first meta die on which to execute the host instruction. If the controller identifies that at least one inactive die is present on the first meta die and that the first meta die has unused bandwidth, the controller selects a second meta die having a pending background operation. The controller transfers the unused bandwidth from the first meta die to the second meta die. The controller executes the background operation on the second meta die, using the unused bandwidth from the first meta die, in parallel with foreground operation on the first meta die.

In some implementations, a method is provided for optimizing die utilization in multi-meta die-based storage device. The method includes receiving host instructions and selecting a first meta die on which to execute the host instructions. The method also includes identifying that at least one inactive die is present on the first meta die and that the first meta die has unused bandwidth. The method further includes selecting a second meta die having a background operation and transferring the unused bandwidth from the first meta die to the second meta die. The method also includes executing the background operation on the second meta die, using the unused bandwidth from the first meta die, in parallel with foreground operation on the first meta die.

In some implementations, a storage device optimizes die utilization in multi-meta die-based environments. The storage device includes a memory device including multiple meta dies. When a controller on the storage device receives host instructions, the controller selects a first meta die on which to execute background operations. If the controller identifies that at least one inactive die is present on the first meta die due to unavailable system resources and that the first meta die has unused bandwidth, the controller selects a second meta die where low resource maintenance operations can be executed using the unused bandwidth from the first meta die. The controller transfers the unused bandwidth from the first meta die to the second meta and executes the low resource maintenance operations on the second meta die in parallel with the background operations on the first meta die.

BRIEF DESCRIPTION OF THE SEVERAL VIEWS OF THE DRAWINGS

FIG. 5 is an example flow diagram for optimizing usage of dies during background data relocation in a storage device in accordance with some implementations.

Figure 1:
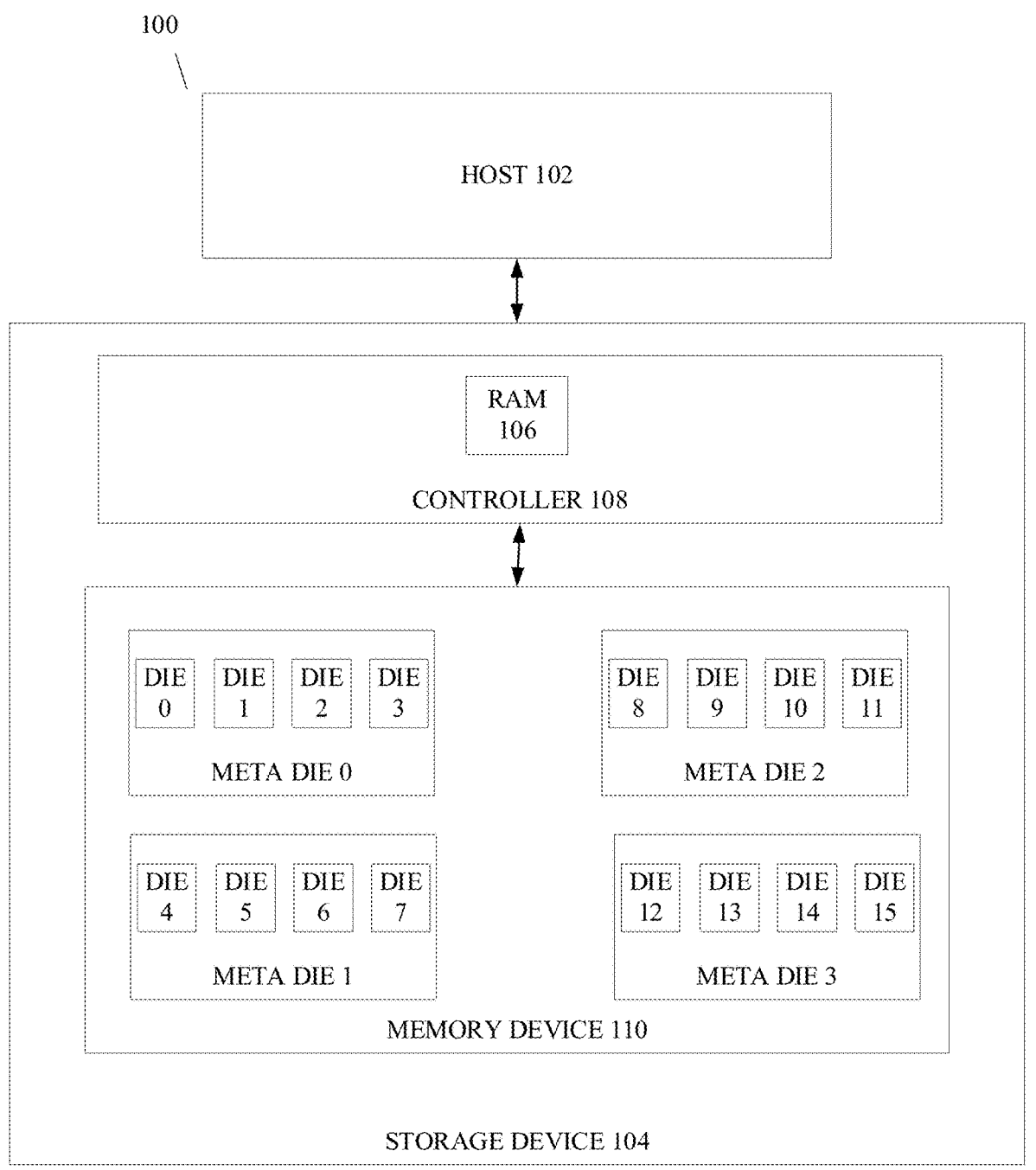
FIG. 1 is a schematic block diagram of an example system in accordance with some implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements.

FIG. 1 is a schematic block diagram of an example system in accordance with some implementations. System 100 includes a host 102 and a storage device 104. Host 102 and storage device 104 may be in the same physical location as components on a single computing device or on different computing devices that are communicatively coupled. Storage device 104, in various embodiments, may be disposed in one or more different locations relative to the host 102. System 100 may include additional components (not shown in this figure for the sake of simplicity).

Storage device 104 may include a random-access memory (RAM) 106, a controller 108, and one or more non-volatile memory devices (referred to herein as the memory device(s) 110). Storage device 104 may be, for example, a solid-state drive (SSD), and the like. RAM 106 may be temporary storage such as a dynamic RAM (DRAM) that may be used to cache information in storage device 104.

Memory device 110 may be flash based. For example, memory device 110 may be a NAND flash memory that may be used for storing host and control data over the operational life of memory device 110. Memory device 110 may be included in storage device 104 or may be otherwise communicatively coupled to storage device 104. Memory device 110 may include multiple dies (shown as Die 0-Die 15) which may be grouped into meta dies (shown as meta dies 0-3) in accordance with capacity requirements of storage device 104. Data may be stored in the blocks on memory device 110 in various formats, with the formats being defined by the number of bits that may be stored per memory cell. For example, a single-layer cell (SLC) format may write one bit of information per memory cell, a multi-layer cell (MLC) format may write two bits of information per memory cell, a triple-layer cell (TLC) format may write three bits of information per memory cell, and a quadruple-layer cell (QLC) format may write four bits of information per memory cell, and so on. The blocks in memory device 110 may be hybrid blocks, wherein the blocks may be programmed in multiple formats. For example, a block may be initially programmed as an SLC block and later programmed as a TLC block. Formats storing fewer bits in each cell are more easily accessed and programmed, more durable, and less error-prone than formats storing more bits per cell. However, formats storing fewer bits in each cell are also more expensive.

To increase the performance of storage device 104, the blocks on memory device 110 may be divided into, for example, a sustain pool and a burst pool. For example, if storage device 104 has one terabyte (TB) capacity, the sustain pool may include, for example, one thousand TLC blocks, each of which may store one gigabyte of data, covering the 1 TB capacity of storage device 104. The burst pool may include additional SLC blocks equal to a percentage of the blocks in the sustain pool. Some of the blocks in the burst pool may be used for storing host data and some of the blocks may be used for storing control data. When meta dies are being formed on storage device 104, the meta dies may be formed based on, for example, the power ceiling of storage device 104 and a sustained write path speed in the sustain pool.

Controller 108 may interface with host 102 and process foreground operations including instructions transmitted from host 102. For example, controller 108 may read data from and/or write to memory device 110 based on instructions received from host 102. Controller 108 may further execute internal/background operations to manage resources on memory device 110. For example, controller 108 may monitor memory device 110 and may perform maintenance operations such as read scrub, execute garbage collection and other relocation functions per internal relocation algorithms to refresh and/or relocate the data on memory device 110, and clean up a memory pool such as a burst pool. To reduce impacting foreground operations, controller 108 may identify idle/inactive periods on storage device 104 when storage device 104 is not executing foreground operations and controller 108 may execute the background operations during the idle periods. As the capacity of storage device 104 increases, there may not be sufficient idle periods during which controller 108 may execute the background operations without impacting the foreground operations and affecting the performance of storage device 104.

Controller 108 may therefore optimize die utilization to fully use the power allotted to storage device 104 so that storage device 104 may execute background operations in parallel with foreground operations without having execution of the background operation impact the foreground operations and thus affect the performance of storage device 104. In a multiple meta die environment, controller 108 may identify instances where not all of the dies in an active meta die (i.e., a meta die currently being used by controller 108) are being used. When a die in an active meta die is not being used, the unused die may be referred to herein as an inactive die. For the uniform utilization of the blocks on all the dies on storage device 104, controller 108 may write to a first meta block on a first meta die (for example, meta die 0), then the first meta block on a second meta die (for example, meta die 1), then the first meta block on a third meta die (for example, meta die 2), and so on. As controller 108 operates on the meta block level, controller 108 may determine how long a given meta die may be active.

For example, based on the current host operations being executed on a meta block (also referred to herein as an active meta block), controller 108 may determine how long a given meta die may be active. When controller 108 identifies instances where not all of the dies in a first (active) meta die are being used, controller 108 may use its determination of how long the first meta die may be active to identify the power that is being unused by the first meta die. Controller 108 may allocate the unused power from the first meta die to one or more second meta dies to execute parallel background operations on one or more dies in one or more second meta die(s) and consume the maximum power available to storage device 104.

In cases where a sequential host write operation is being performed on a meta block storing fewer bits per cell, controller 108 may not need to use all dies in a meta die. For example, when sequential host write operation is being performed on a SLC meta block, controller 108 may not need to use all dies in the meta die during the SLC write. Consider an example where one die on memory device 110 may be written on at a speed of 800 megabits per second (MBps) (i.e., 64 kilobytes (KB) in approximately 80 μs). For a host providing 2 gigabits per second (GBps) throughput, only four to five dies in storage device 104 including sixteen dies may need to operate. Similarly, controller 108 may not need to use all dies in a meta die during the SLC sequential read, though the window may be bit smaller.

When host 102 sends a foreground instruction to storage device 104, controller 108 may select a first meta die (i.e., the active meta die) on which to execute the foreground operation. For example, controller 108 may select meta die 1 to be used in executing the foreground instructions. Controller 108 may determine if all dies in meta die 1 are active, i.e., if all the dies in meta die 1 at being used. If controller 108 determines, for example, that dies 6 and 7 in meta die 1 are inactive, controller 108 may identify a second meta die that has the highest priority pending background operation. For example, controller 108 may identify which of the inactive meta dies (i.e., meta dies 0, 2, and 3) has the most critical pending background operations. Controller 108 may determine how much power is being unused by the active meta die (i.e., meta die 1), select one or more second meta dies that have the highest priority pending background operation, and transfer the unused power from the first meta die to the second meta die(s) with the most critical pending background operations. Controller 108 may then schedule background operations on one or more inactive meta die(s) with the highest priority background operation. For example, if controller 108 determines that meta die 3 has the most critical pending background operations, controller 108 may transfer the unused power from meta die 1 to meta die 3 and may carry out the host operations on meta die 1 and the background operations on meta die 3 in parallel.

In an implementation, storage device 104 may not include sufficient system resources to operate all dies in parallel during background data relocation. Consider an example where storage device 104 does not include sufficient RAM or DMA speed to operate all dies in meta dies 0-3 in parallel during background data relocation. When controller 108 determines, for example, that dies 6 and 7 in active meta die 1 are inactive, controller 108 may investigate the storage device resources/state to determine if dies in active meta die 1 are inactive because of insufficient resources. If controller 108 determines that storage device 104 is resource constrained, controller 108 may identify an inactive meta die where maintenance operations may be carried out without using the unavailable resources. Controller 108 may perform low resource operations on one or more other meta dies (for example, meta dies 0 and 2-3) using the unused power from meta die 1. The low resource operations may not need resources that are lacking to operate dies 6 and 7 in active meta die 1. For example, instead of using the RAM or DMA speed, controller 108 may perform an off-chip copy operation to fold host data written in a format with fewer bits per memory cell to a format with more bits per memory cell.

Assume a scenario where due to fragmentation or some other reason, relocation operations are pending on an active meta die (for example, meta die 1). If storage device 104 has insufficient resources (for example, RAM and/or DMA speed), relocations may be performed at a slower rate. Controller 108 may not allow host writes at a faster pace in that controller 108 may have to free space by defragmentation, otherwise memory device 110 may run out of free space. In such a scenario, controller 108 may find an inactive meta die (for example, meta die 4) where the maintenance operation may not require the resources that are not available to the active meta die. For example, controller may determine that off chip copy (folding) operations are pending on meta die 4 and controller 108 may select the inactive meta die (in this case, meta die 4) and allocate the free (unused) bandwidth from meta die 1 to perform parallel background operations that may not require the resources that are not available to active meta die 1 which is being used for foreground operation.

By operating in a multi-meta die environment, parallel background operations being carried out on a second meta die may not impede/block host operations being carried out on a first meta die. Controller 108 may thus perform background operations on non-active meta dies without slowing down current ongoing host operations. As a result, host 102 may experience a better quality of service as host 102 may experience less throttling due to the processing of internal operations on storage device 104.

Storage device 104 may perform these processes based on a processor, for example, controller 108 executing software instructions stored by a non-transitory computer-readable medium, such as storage component 110. As used herein, the term "computer-readable medium" refers to a non-transitory memory device. Software instructions may be read into storage component 110 from another computer-readable medium or from another device. When executed, software instructions stored in storage component 110 may cause controller 108 to perform one or more processes described herein. Additionally, or alternatively, hardware circuitry may be used in place of or in combination with software instructions to perform one or more processes described herein. Thus, implementations described herein are not limited to any specific combination of hardware circuitry and software. System 100 may include additional components (not shown in this figure for the sake of simplicity). FIG. 1 is provided as an example. Other examples may differ from what is described in FIG. 1.

Figure 2:
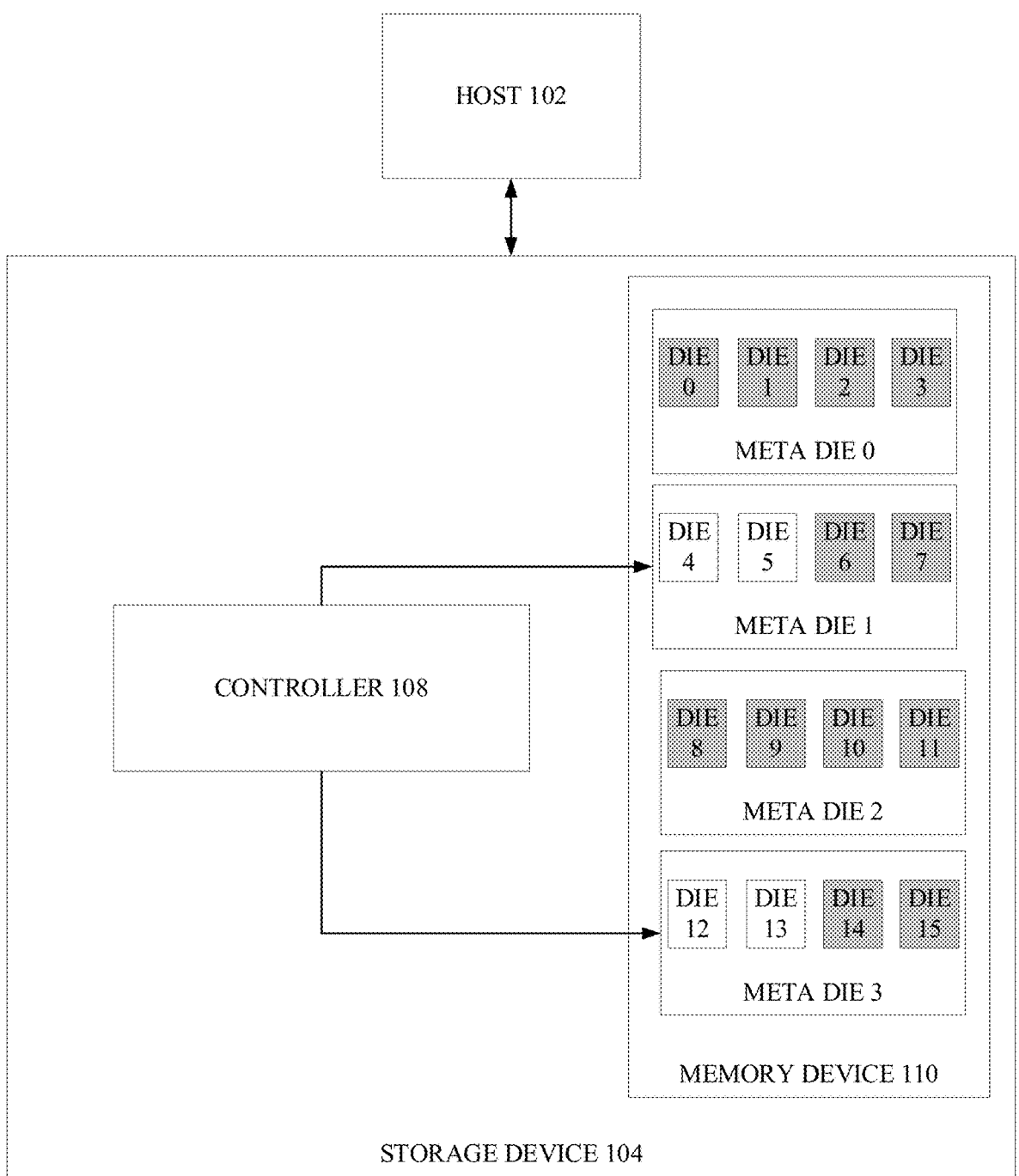
FIG. 2 is a block diagram of an example of how usage of dies in a storage device is optimized in accordance with some implementations.

FIG. 2 is a block diagram of an example of how usage of dies in a storage device is optimized in accordance with some implementations. When host 102 sends instructions to storage device, controller may select meta die 1. While the host data is being processed on meta die 1, controller 108 may determine that not all of the dies in meta die 1 are active. For example, controller 108 may determine that dies 6 and 7 in met die 1 are not being used. Inactive meta dies and dies are shaded in FIG. 2

While processing the host instructions on meta die 1 and after determining that meta die 1 has unused bandwidth, controller 108 may determine that meta die 3 has pending internal operations with a highest priority. Controller 108 may calculate how much power is unused by meta die 1 and may allocate the unused power to meta die 3. Controller 108 may then schedule background operation on meta die 3 while executing the host operations on meta die 1. As such, controller 108 may execute the host operations in parallel with the background operations without slowing down the host operations to execute the background operations. FIG. 2 is provided as an example. Other examples may differ from what is described in FIG. 2.

Figure 3:
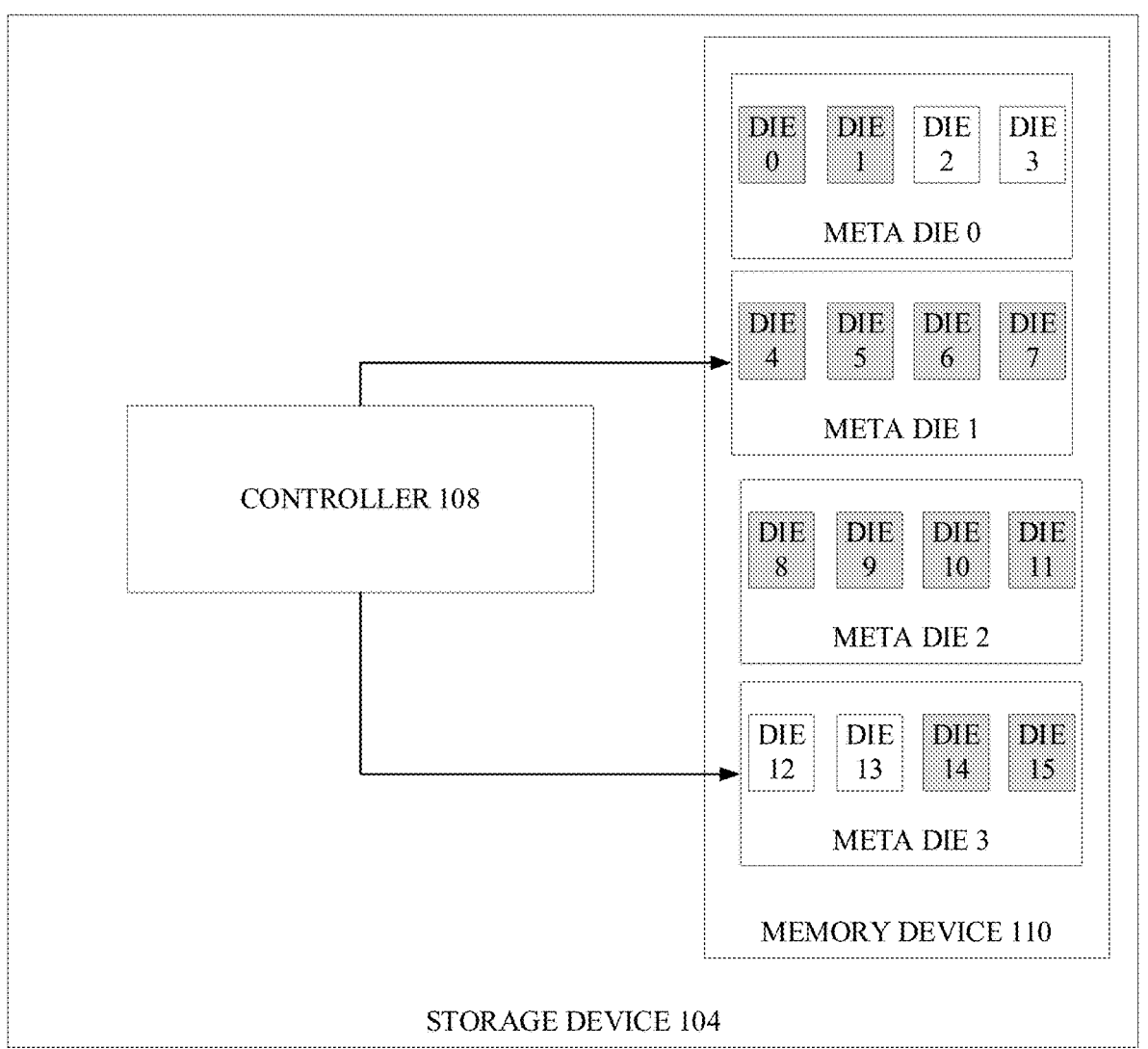
FIG. 3 is a block diagram of an example of how usage of dies in a storage device is optimized during background data relocation in accordance with some implementations.

FIG. 3 is a block diagram of an example of how usage of dies in a storage device is optimized during background data relocation in accordance with some implementations. Storage device 104 may not include sufficient resources to operate all dies in meta die 0 in parallel during background data relocation. When controller 108 identifies that, for example, die 2 and die 3 on meta die 0 are not being used during background data relocation because of sufficient resources, controller 108 may identify one or more other meta dies where background operations may be performed without the resources that were not available for processing the background operations on die 2 and die 3 on meta die 0. For example, controller may identify meta die 3 as a die where low resource background operations may be performed in parallel with the operations on meta die 0. The low resource operations may not need resources that are lacking to operate dies 2 and 3 in meta die 0. FIG. 3 is provided as an example. Other examples may differ from what is described in FIG. 3.

Figure 4:
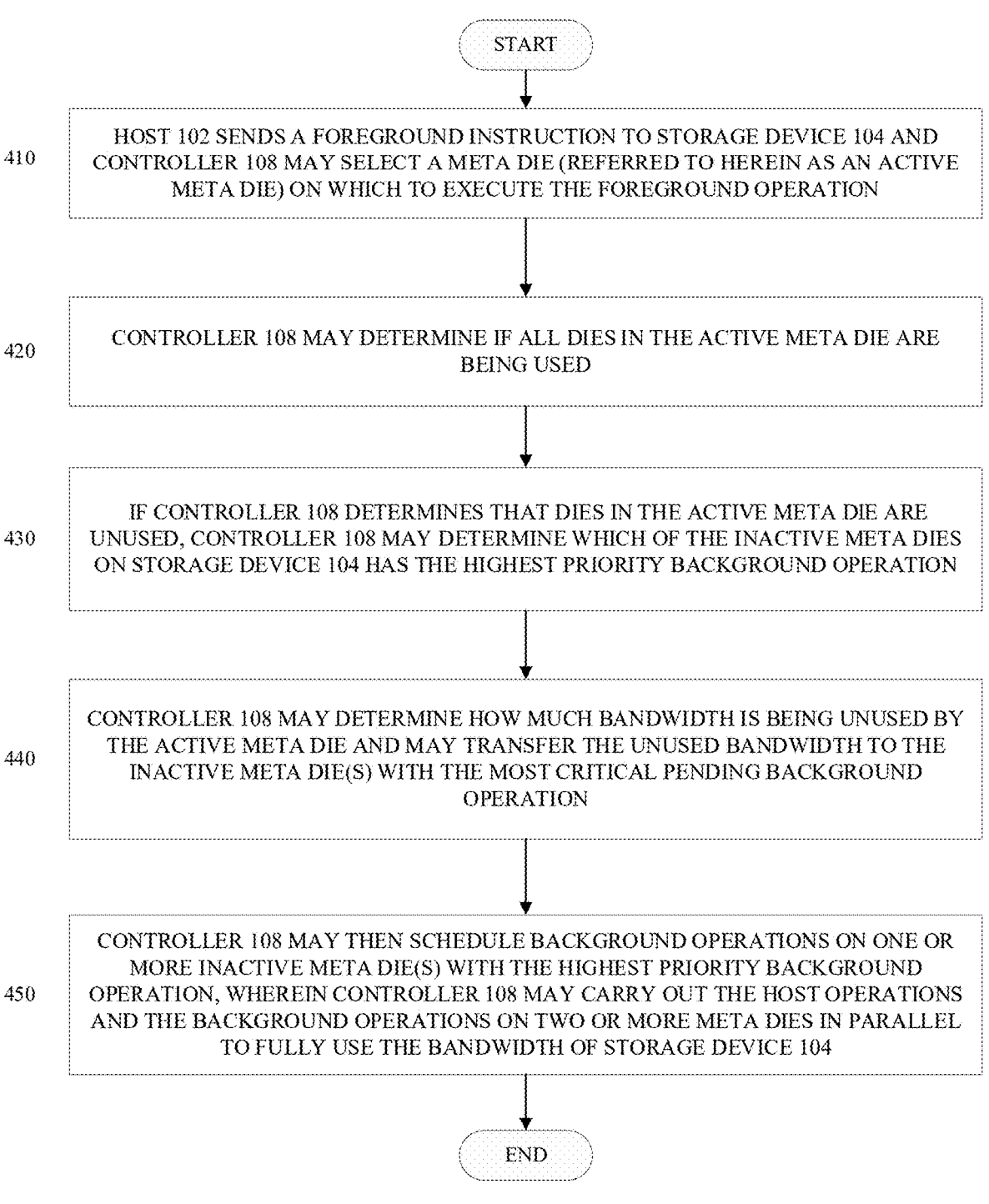
FIG. 4 is an example flow diagram for optimizing usage of dies in a storage device in accordance with some implementations.

FIG. 4 is an example flow diagram for optimizing usage of dies in a storage device in accordance with some implementations. At 410, host 102 sends a foreground instruction to storage device 104 and controller 108 may select a meta die (referred to herein as an active meta die) on which to execute the foreground operation. At 420, controller 108 may determine if all dies in the active meta are being used. At 430, if controller 108 determines that dies in the active meta die are unused, controller 108 may determine which of the inactive meta dies on storage device 104 has the highest priority background operation. At 440, controller 108 may determine how much bandwidth is being unused by the active meta die and may transfer the unused bandwidth to the inactive meta die(s) with the most critical pending background operations. At 450, controller 108 may then schedule background operations on one or more inactive meta die(s) with the highest priority background operation, wherein controller 108 may carry out the host operations and the background operations on two or more meta dies in parallel to fully use the bandwidth of storage device 104. FIG. 4 is provided as an example. Other examples may differ from what is described in FIG. 4.

FIG. 5 is an example flow diagram for optimizing usage of dies during background data relocation in a storage device in accordance with some implementations. At 510, when controller 108 determines, for example, that dies in an active first meta die are unused, controller 108 may investigate the storage device resources/state to determine if the dies in the active first meta die are inactive because of insufficient resources. At 520, if controller 108 determines that storage device 104 is resource constrained, controller 108 may identify an inactive meta die where low resource maintenance operations may be carried out without the unavailable resources. At 530, controller 108 may allocate the free (unused) bandwidth from the active first meta die to one or more inactive second meta dies where low resource maintenance operations may be carried out without the unavailable resources. At 540, controller 108 may schedule the low resource maintenance operations on one or more inactive second meta dies, thereby making the second meta die(s) active. At 550, controller 108 may execute the low resource maintenance operations on the active second meta die in parallel with the background operation being carried out on the active first meta die to fully use the bandwidth of storage device 104. FIG. 5 is provided as an example. Other examples may differ from what is described in FIG. 5.

Figure 6:
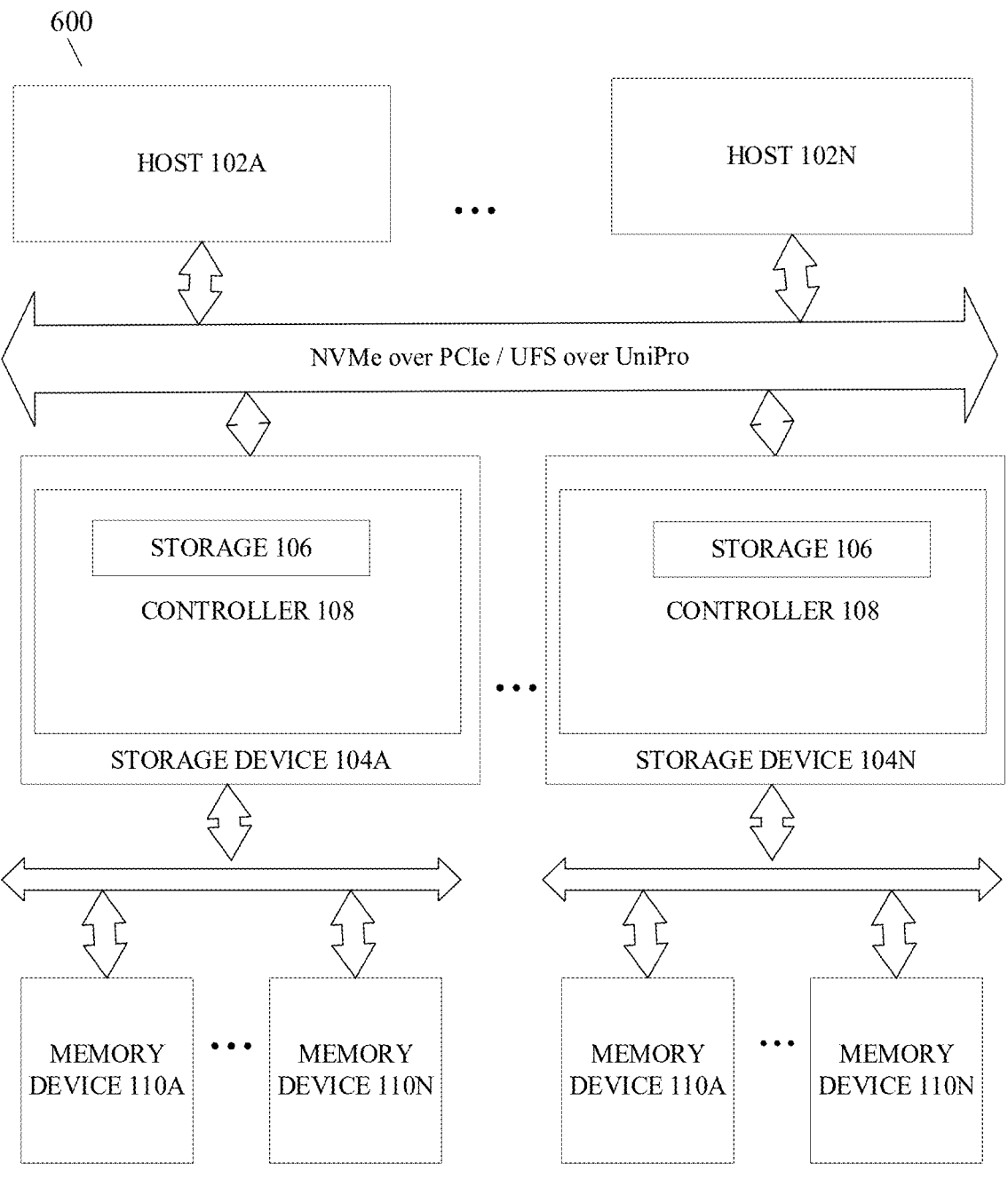
FIG. 6 is a diagram of an example environment in which systems and/or methods described herein are implemented.

FIG. 6 is a diagram of an example environment in which systems and/or methods described herein are implemented. As shown in FIG. 6, Environment 600 may include hosts 102-102n (referred to herein as host(s) 102), and storage devices 104a-104n (referred to herein as storage device(s) 104).

Storage device 104 may include a controller 108 to dynamically optimize usage of dies when a storage device including a memory device 110 having multiple meta dies. Hosts 102 and storage devices 104 may communicate via Non-Volatile Memory Express (NVMe) over peripheral component interconnect express (PCI Express or PCIe) standard, the Universal Flash Storage (UFS) over Unipro, or the like.

Devices of Environment 600 may interconnect via wired connections, wireless connections, or a combination of wired and wireless connections. For example, the network of FIG. 6 may include a cellular network (e.g., a long-term evolution (LTE) network, a code division multiple access (CDMA) network, a 3G network, a 4G network, a 4G network, another type of next-generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 6 are provided as an example. In practice, there may be additional devices and/or networks, fewer devices and/or networks, different devices and/or networks, or differently arranged devices and/or networks than those shown in FIG. 6. Furthermore, two or more devices shown in FIG. 6 may be implemented within a single device, or a single device shown in FIG. 6 may be implemented as multiple, distributed devices. Additionally, or alternatively, a set of devices (e.g., one or more devices) of Environment 600 may perform one or more functions described as being performed by another set of devices of Environment 600.

Figure 7:
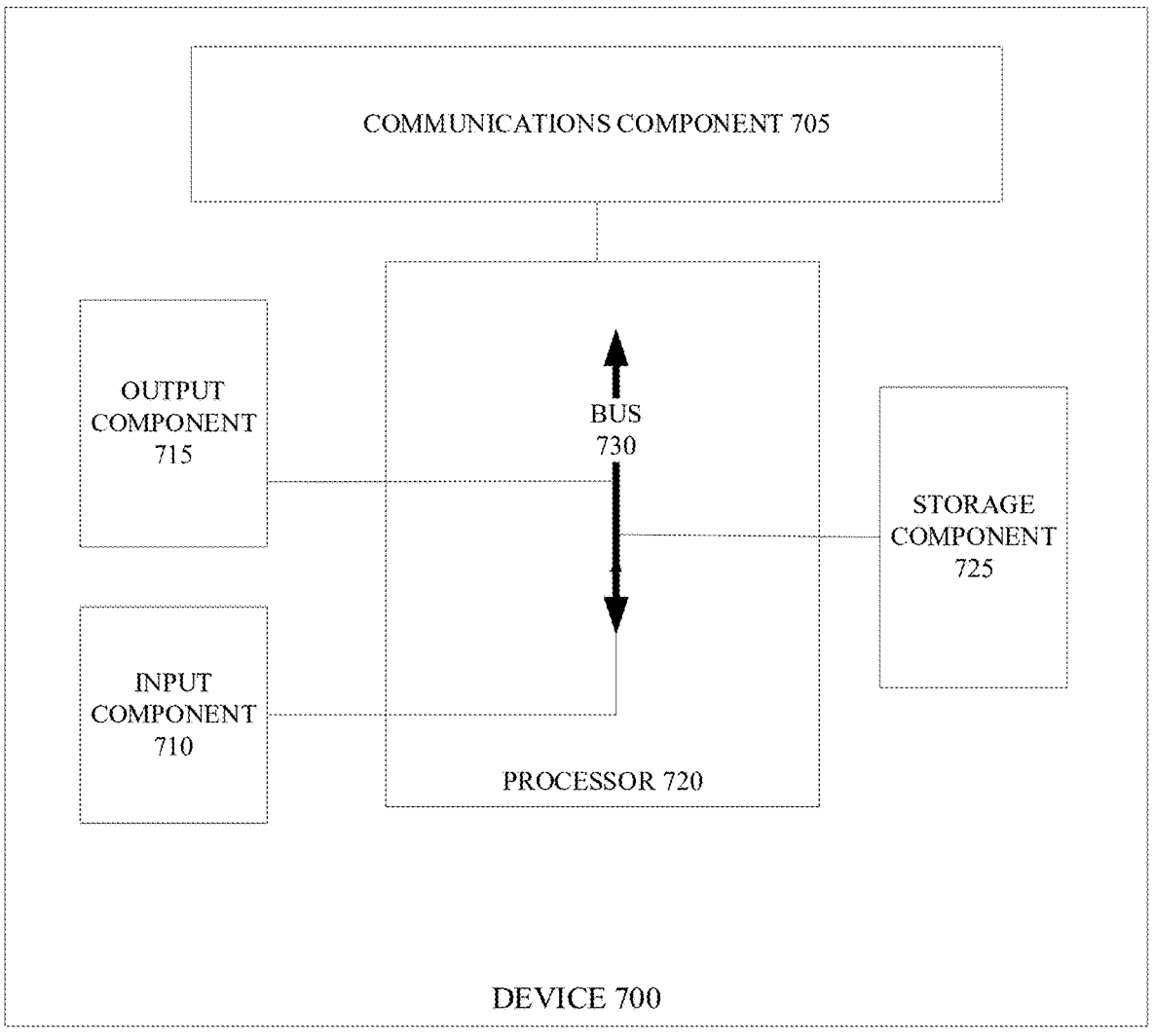
FIG. 7 is a diagram of example components of the host of FIG. 1.

FIG. 7 is a diagram of example components of one or more devices of FIG. 1. In some implementations, host 102 may include one or more devices 700 and/or one or more components of device 700. Device 700 may include, for example, a communications component 705, an input component 710, an output component 715, a processor 720, a storage component 725, and a bus 730. Bus 730 may include components that enable communication among multiple components of device 700, wherein components of device 700 may be coupled to be in communication with other components of device 700 via bus 730.

Input component 710 may include components that permit device 700 to receive information via user input (e.g., keypad, a keyboard, a mouse, a pointing device, a microphone, and/or a display screen), and/or components that permit device 700 to determine the location or other sensor information (e.g., an accelerometer, a gyroscope, an actuator, another type of positional or environmental sensor). Output component 715 may include components that provide output information from device 700 (e.g., a speaker, display screen, and/or the like). Input component 710 and output component 715 may also be coupled to be in communication with processor 720.

Processor 720 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 720 may include one or more processors capable of being programmed to perform a function. Processor 720 may be implemented in hardware, firmware, and/or a combination of hardware and software.

Storage component 725 may include one or more memory devices, such as random-access memory (RAM) 106, read-only memory (ROM), and/or another type of dynamic or static storage device (e.g., a flash memory, a magnetic memory, and/or optical memory) that stores information and/or instructions for use by processor 720. A memory device may include memory space within a single physical storage device or memory space spread across multiple physical storage devices. Storage component 725 may also store information and/or software related to the operation and use of device 700. For example, storage component 725 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Communications component 705 may include a transceiver-like component that enables device 700 to communicate with other devices, such as via a wired connection, a wireless connection, or a combination of wired and wireless connections. The communications component 705 may permit device 700 to receive information from another device and/or provide information to another device. For example, communications component 705 may include an Ethernet interface, an optical interface, a coaxial interface, an infrared interface, a radio frequency (RF) interface, a universal serial bus (USB) interface, a Wi-Fi interface, and/or a cellular network interface that may be configurable to communicate with network components, and other user equipment within its communication range. Communications component 705 may also include one or more broadband and/or narrowband transceivers and/or other similar types of wireless transceiver configurable to communicate via a wireless network for infrastructure communications. Communications component 705 may also include one or more local area network or personal area network transceivers, such as a Wi-Fi transceiver or a Bluetooth transceiver.

Device 700 may perform one or more processes described herein. For example, device 700 may perform these processes based on processor 720 executing software instructions stored by a non-transitory computer-readable medium, such as storage component 725. As used herein, the term "computer-readable medium" refers to a non-transitory memory device. Software instructions may be read into storage component 725 from another computer-readable medium or from another device via communications component 705. When executed, software instructions stored in storage component 725 may cause processor 720 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 7 are provided as an example. In practice, device 700 may include additional components, fewer components, different components, or differently arranged components than those shown in FIG. 7. Additionally, or alternatively, a set of components (e.g., one or more components) of device 700 may perform one or more functions described as being performed by another set of components of device 700.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related items, unrelated items, and/or the like), and may be used interchangeably with "one or more." The term "only one" or similar language is used where only one item is intended. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

We claim:

1. A storage device to optimize die utilization in multi-meta die-based environments, the storage device comprises:
    a memory device including multiple meta dies; and
    a controller to select a first meta die on which to execute host instruction, determine how long the first meta die is to be active in executing the host instruction and calculate power to be used by the first meta die in executing the host instruction, identify that at least one inactive die is present on the first meta die and that the first meta die has unused bandwidth, select a second meta die having a pending background operation, transfer the unused bandwidth from the first meta die to the second meta die, allocate unused power from the first meta die to the second meta die and execute the background operation on the second meta die, using the unused bandwidth and unused power from the first meta die, in parallel with foreground operation on the first meta die to consume a maximum amount of power available to the storage device.

2. The storage device of claim 1, wherein the second meta die has a highest priority background operation.

3. The storage device of claim 1, wherein the controller identifies the unused bandwidth on the first meta die based on how long the first meta die is to remain active.

4. The storage device of claim 1, wherein the controller identifies the second meta die as an inactive meta die having a most critical pending background operations.

5. The storage device of claim 1, wherein the controller determines whether an inactive die is present on the first meta die because of insufficient system resources.

6. The storage device of claim 1, wherein when the controller determines that the storage device is resource constrained, the controller identifies an inactive meta die where maintenance operations can be executed using the unused bandwidth from the first meta die, wherein the maintenance operations are executed without unavailable resources.

7. The storage device of claim 1, wherein each of the meta dies includes two or more dies, wherein when all dies in a meta die are operational, a full bandwidth of the storage device is used.

8. The storage device of claim 1, wherein a meta die is formed based on a capacity of the storage device at a given speed.

9. A method for optimizing die utilization in multi-meta die-based storage device, the storage device comprises a controller to execute the method comprising:
    receiving host instructions;
    selecting a first meta die on which to execute the host instructions;
    determining how long the first meta die is to be active in executing the host instruction and calculating power to be used by the first meta die in executing the host instruction;
    identifying that at least one inactive die is present on the first meta die and that the first meta die has unused bandwidth;
    selecting a second meta die having a background operation;
    transferring the unused bandwidth from the first meta die to the second meta die;
    allocating unused power from the first meta die to the second meta die; and
    executing the background operation on the second meta die, using the unused bandwidth and unused power from the first meta die, in parallel with foreground operation on the first meta die to consume a maximum amount of power available to the storage device.

10. The method of claim 9, wherein selecting the second meta die comprises selecting a meta die with a highest priority pending background operation.

11. The method of claim 9, further comprising identifying the unused bandwidth on the first meta die based on how long the first meta die is to remain active.

12. The method of claim 9, further comprising identifying the second meta die as an inactive meta die having a most critical pending background operations.

13. The method of claim 9, further comprising determining whether an inactive die is present on the first meta die because of insufficient system resources.

14. The method of claim 9, further comprising determining that the storage device is resource constrained and identifying an inactive meta die where maintenance operations can be executed using the unused bandwidth from the first meta die, wherein the maintenance operations are executed without unavailable resources.

15. The method of claim 9, further comprising using a full bandwidth of the storage device when all dies in a meta die are in used.

16. The method of claim 9, further comprising forming a meta die based on a capacity of the storage device at a given speed.

17. A storage device to optimize die utilization in multi-meta die-based environments, the storage device comprises:
    a memory device including multiple meta dies;
    a controller to select a first meta die on which to execute background operations, identify that at least one inactive die is present on the first meta die due to unavailable system resources and that the first meta die has unused bandwidth and unused power, select a second meta die where low resource maintenance operations can be executed using the unused bandwidth from the first meta die, transfer the unused bandwidth and unused power from the first meta die to the second meta, and execute the low resource maintenance operations on the second meta die in parallel with the background operations on the first meta die to consume a maximum amount of power available to the storage device.

18. The storage device of claim 17, wherein the low resource maintenance operations are executed without using the unavailable system resources.

* * * * *